(12) United States Patent
Satou

(10) Patent No.: US 8,049,454 B2
(45) Date of Patent: Nov. 1, 2011

(54) ROUGH AND FINE MOVEMENT DEVICE, AND LIQUID SUPPLY DEVICE INCORPORATING THE SAME

(75) Inventor: Seiichi Satou, Chigasaki (JP)

(73) Assignee: Ulvac, Inc., Kanagawa (JP)

( * ) Notice: Subject to any disclaimer, the term of this patent is extended or adjusted under 35 U.S.C. 154(b) by 438 days.

(21) Appl. No.: 12/377,210

(22) PCT Filed: Apr. 22, 2008

(86) PCT No.: PCT/JP2008/057771
§ 371 (c)(1),
(2), (4) Date: Feb. 11, 2009

(87) PCT Pub. No.: WO2009/001611
PCT Pub. Date: Dec. 31, 2008

(65) Prior Publication Data
US 2010/0175490 A1    Jul. 15, 2010

(30) Foreign Application Priority Data

Jun. 27, 2007  (JP) ................................ 2007-169293

(51) Int. Cl.
G05B 11/01   (2006.01)
B64C 17/06   (2006.01)
(52) U.S. Cl. ........................................ 318/560; 318/649
(58) Field of Classification Search .................. 318/560
See application file for complete search history.

(56) References Cited

U.S. PATENT DOCUMENTS

| 4,234,175 A | 11/1980 | Sato et al. |
| 4,805,543 A | 2/1989 | Schwab et al. |
| 2007/0095175 A1 | 5/2007 | Ostendarp |
| 2007/0101836 A1 | 5/2007 | Ostendarp |
| 2007/0242247 A1 * | 10/2007 | Shiraishi ........................ 355/53 |

FOREIGN PATENT DOCUMENTS

| CN | 1946514 A | * | 4/2007 |
| CN | 1946514 A | | 4/2007 |
| CN | 200580012801.9 | | 4/2007 |
| JP | 54-85678 | | 7/1979 |
| JP | 62-55590 | | 3/1987 |
| JP | 05066592 A | * | 3/1993 |
| JP | 5-66592 | | 9/1993 |
| JP | 07-128467 | | 5/1995 |
| JP | 07-241743 | | 9/1995 |
| JP | 07-270559 | | 10/1995 |
| JP | 07270559 A | * | 10/1995 |
| JP | 2003-001170 | | 1/2003 |
| JP | 2003-288839 | | 10/2003 |

* cited by examiner

Primary Examiner — Walter Benson
Assistant Examiner — Jorge Carrasquillo
(74) Attorney, Agent, or Firm — Patterson Thuente Christensen Pedersen P.A.

(57) ABSTRACT

A rough and fine movement device capable of moving a mobile body with high accuracy, and a liquid supply device incorporating such a device. First and second mobile bodies are movable along guide members with a connection member connecting the mobile bodies in a relatively movable manner. A first drive mechanism roughly moves the first mobile body by a first stroke. A second drive mechanism between the first and the second mobile bodies, finely moves the second mobile body relative to the first mobile body by a second stroke. The second drive mechanism on one of the first and second mobile bodies and includes an actuator having a contactor with a first contact surface. The other of the bodies includes a second contact surface which contacts the first contact surface. At least one of the first contact surface or the second contact surface is spherical.

8 Claims, 8 Drawing Sheets

ROUGH AND FINE MOVEMENT DEVICE, AND LIQUID SUPPLY DEVICE INCORPORATING THE SAME

PRIORITY CLAIM

The present application is a National Phase entry of PCT Application No. PCT/JP2008/057771, filed Apr. 22, 2008, which claims priority from Japanese Application Number 2007-169293, filed Jun. 27, 2007, the disclosures of which are hereby incorporated by reference herein in their entirety.

FIELD OF THE INVENTION

The present invention relates to a rough and fine movement device for accurately moving a mobile body to a predetermined position through rough movements of large strokes and fine movements of fine strokes, and a liquid supply device incorporating such a rough and fine movement device.

BACKGROUND OF THE INVENTION

A liquid supply device includes a mobile body having a supply head and, for example, supplies liquid from the supply head onto a substrate that serves as a work piece to form a liquid applied portion, which has a predetermined pattern. In such a liquid supply device, the mobile body must always be arranged at a position constantly spaced by a predetermined distance from the surface of the substrate to form a uniform liquid applied portion. In the prior art, for example, patent document 1 proposes a rough and fine movement device that fulfills such a requirement.

In the rough and fine movement device of the prior art, two rails are arranged on a base to movably support a first mobile body and a second mobile body. A feed screw is arranged on the base. A nut is fixed to the first mobile body and mated with the feed screw. A piezoelectric element is arranged between the first mobile body and second mobile body. Further, two coil springs connect the two mobile bodies. A drive motor rotates the feed screw to roughly move the first mobile body and the second mobile body in large strokes. Voltage is applied to the piezoelectric element in a state in which the rough movement is stopped to expand or contract the piezoelectric element so as to finely move the second mobile body in fine strokes relative to the first mobile body. Such movements enable fine adjustments when positioning a moved member, which is held on the second mobile body, at a predetermined position.

However, in the rough and fine movement device of the prior art, for example, low machining accuracy or low assembly accuracy of the feed screw may affect the second mobile body from the first mobile body through the piezoelectric element. In such a case, the second mobile body cannot be moved to the required position with high accuracy even if the accuracy of the rails is ensured. In the rough and fine movement device of patent document 1, there have been no measures coping with such a problem. Thus, the accuracy for moving the second mobile body to the desired position is low.

Patent Document 1: Japanese Laid-Open Utility Model Publication No. 5-66592

SUMMARY OF THE INVENTION

One aspect of the present invention provides a rough and fine movement device that moves a mobile body to a required position with high accuracy.

A further aspect of the invention provides a liquid supply device that forms a liquid applied portion on a work piece with high accuracy.

A first aspect of the present invention is a rough and fine movement device. The device includes a guide member. A first mobile body and a second mobile body are movable along the guide member. A connection member connects the first mobile body and the second mobile body in a relatively movable manner. A first drive mechanism roughly moves the first mobile body by a first stroke. A second drive mechanism is arranged between the first mobile body and the second mobile body and finely moves the second mobile body relative to the first mobile body by a second stroke. The second drive mechanism includes an actuator arranged on one of the first mobile body and the second mobile body. The actuator includes a contactor having a first contact surface. The other one of the first mobile body and the second mobile body has a second contact surface which is contactable with the first contact surface of the contactor. At least one of the first contact surface and the second contact surface is spherical.

A second aspect of the present invention is a liquid supply device. The device includes a rough and fine movement device and a supply head arranged on the rough and fine movement device to supply liquid to a work piece. The rough and fine movement device includes a guide member. A first mobile body and a second mobile body are movable along the guide member in a vertical direction. The supply head is arranged on the second mobile body. A connection member connects the first mobile body and the second mobile body in a relatively movable manner. A first drive mechanism roughly moves the first mobile body by a first stroke. A second drive mechanism is arranged between the first mobile body and the second mobile body and finely moves the second mobile body relative to the first mobile body by a second stroke. The second drive mechanism includes an actuator arranged on one of the first mobile body and the second mobile body. The actuator includes a contactor having a first contact surface. The other one of the first mobile body and the second mobile body has a second contact surface which is contactable with the first contact surface of the contactor. At least one of the first contact surface and the second contact surface is spherical.

A third aspect of the present invention is a liquid supply device. The device includes a rough and fine movement device and a supply head arranged on the rough and fine movement device to supply liquid to a work piece. The rough and fine movement device includes a guide member. A first mobile body and a second mobile body are movable along the guide member in a vertical direction. The supply head is arranged on the second mobile body. A connection member connects the first mobile body and the second mobile body in a relatively movable manner. The rough and fine movement device further includes a motor and a first drive mechanism which is connected to the motor and which roughly moves the first mobile body by a first stroke. The first drive mechanism includes a feed screw, which is rotated by the motor, and a nut, which is fixed to the first mobile body and mated with the feed screw. A first spring is connected so as to act on the nut of the first drive mechanism and bias the nut upward along an axial direction of the feed screw. A second drive mechanism is arranged between the first mobile body and the second mobile body and finely moves the second mobile body relative to the first mobile body by a second stroke. The second drive mechanism includes an actuator arranged on one of the first mobile body and the second mobile body. The actuator includes a contactor having a first contact surface. The other one of the first mobile body and the second mobile body has a second contact surface which is contactable with the first contact surface of the contactor. At least one of the first contact surface and the second contact surface is spherical.

DETAILED DESCRIPTION OF THE PREFERRED EMBODIMENTS INVENTION

First Embodiment

A liquid supply device according to a first embodiment of the present invention will now be discussed with reference to FIGS. 1 to 7. The liquid supply device is applied to, for example, a liquid supply device for a substrate manufacturing apparatus.

Figure 1:
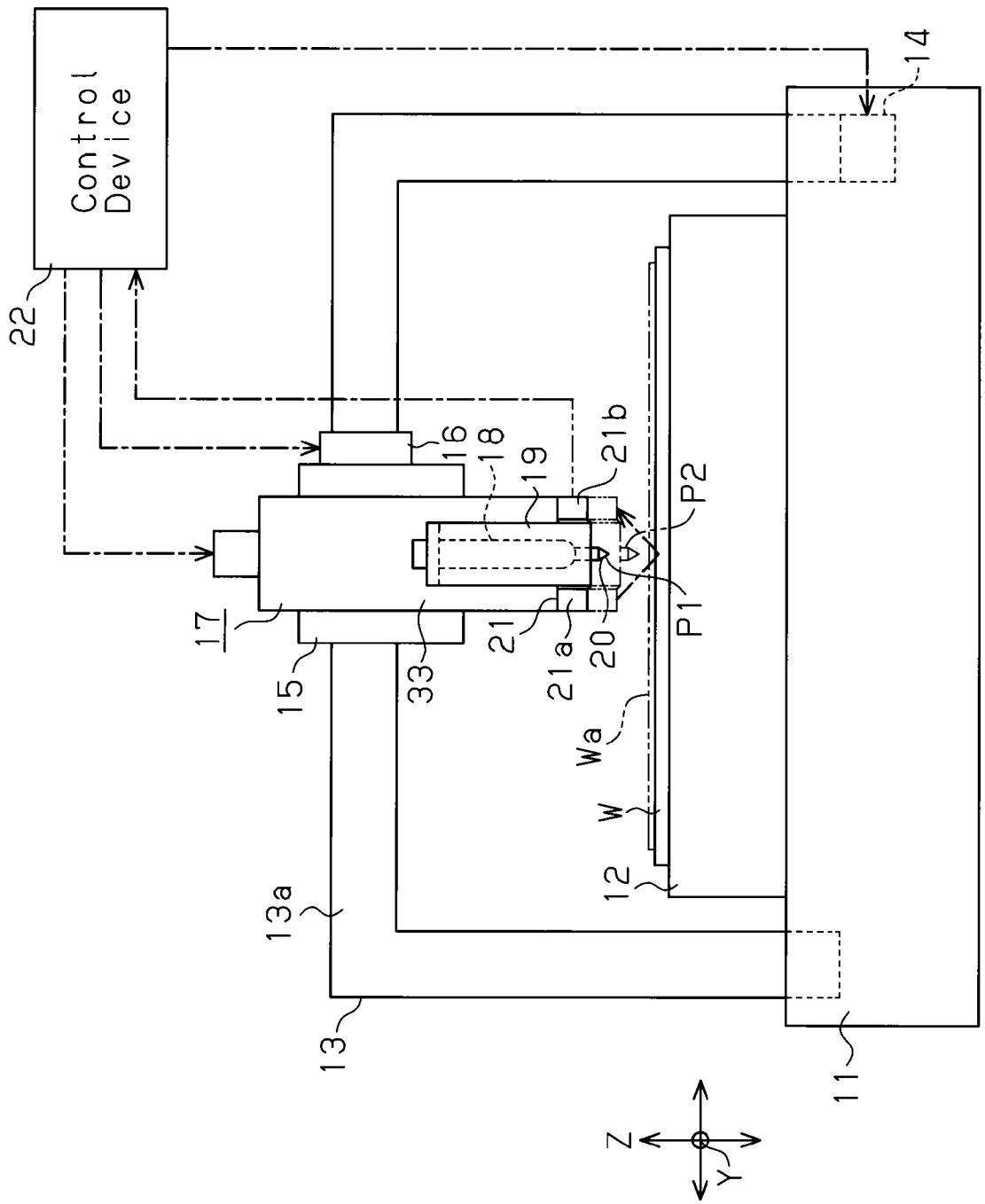
FIG. 1 is a schematic front view showing a liquid supply device incorporating a rough and fine movement device of a first embodiment.

As shown in FIG. 1, the liquid supply device includes a base 11. A table 12 is arranged on the base 11, and a work piece W such as substrate is detachably attached to and held on the upper surface of the table 12 by a vacuum suction device (not shown). A gate-shaped gantry 13 is supported on the base 11 in a state spanning over the table 12 so as to be movable in a Y-axis direction (direction orthogonal to the plane of FIG. 1). The gantry 13 includes a Y-axis actuator 14, which is formed by a motor. The gantry 13 is moved in the Y-axis direction by the Y-axis actuator 14.

An X-axis saddle 15 is supported by a horizontal support 13a of the gantry 13 so as to be movable in an X-axis direction (lateral direction as viewed in FIG. 1). The X-axis saddle 15 includes an X-axis actuator 16. The X-axis saddle 15 is moved in the X-axis direction by the X-axis actuator 16. A rough and fine movement device 17 is attached to a front surface of the X-axis saddle 15. A second mobile body 33, which will be described later, is arranged at the front part of the rough and fine movement device 17 in a manner enabling rough movements and fine adjustment movements (fine movement) in the Z-axis direction (vertical direction in FIG. 1). A rough movement refers to a movement in a large stroke (first stroke) of about several tens of millimeters. A fine movement refers to a movement in a fine stroke (second stroke) of about several micrometers to several tens of micrometers.

A syringe tank 18 for storing liquid, such as sealing material, and a heater block 19 for warming the syringe tank 18 and maintaining the liquid in a softened state are arranged on the front lower surface of the second mobile body 33 in the rough and fine movement device 17. A supply head 20 for supplying liquid from the syringe tank 18 to the underlying work piece W projects from the lower end of the syringe tank 18. After the rough and fine movement device 17 roughly moves the supply head 20 from an upper standby position P1, which is shown by solid lines in FIG. 1, to a lower supply position P2, which is shown by broken lines, liquid is supplied from the supply head 20 to the work piece W to form a liquid applied portion Wa of a predetermined pattern on the work piece W.

A distance sensor 21, which serves as a detection means (detector), is arranged at the lower part of the second mobile body 33 in the rough and fine movement device 17. The distance sensor 21 includes a light emitting portion 21a located on one side of the supply head 20, and a light receiving portion 21b located on the other side of the supply head 20. Laser light is emitted from the light emitting portion 21a of the distance sensor 21 towards the work piece W, and the reflected light from the work piece W is received by the light receiving portion 21b in a state in which the supply head 20 is moved to the supply position P2 by rough movement. The distance between the supply head 20 (specifically, the tip of the supply head 20) and the work piece W is detected by the emission and reception of light. The detection result of the distance sensor 21 is output to a control device 22, which serves as a controller.

The control device 22 provides an actuation signal to the Y-axis actuator 14, the X-axis actuator 16, and the rough and fine movement device 17 based on a predetermined program to move the supply head 20 to a position that corresponds to a liquid supply portion that is required to be formed on the work piece W. Specifically, the control device 22 controls the actuation of the rough and fine movement device 17, and roughly moves the supply head 20 from the standby position P1 to the supply position P2. Then, the control device 22 controls the actuation of a fine movement actuator 50, which will be described later, arranged in the rough and fine movement device 17 in accordance with the detection result from the distance sensor 21. Actuation of the actuator 50 moves the supply head 20 for fine adjustments at the supply position P2 so that the distance between the tip of the supply head 20 and the work piece W is constant. The control device 22 then supplies liquid from the syringe tank 18 to the work piece W.

The structure of the rough and fine movement device 17 will now be discussed in detail.

Figure 2:
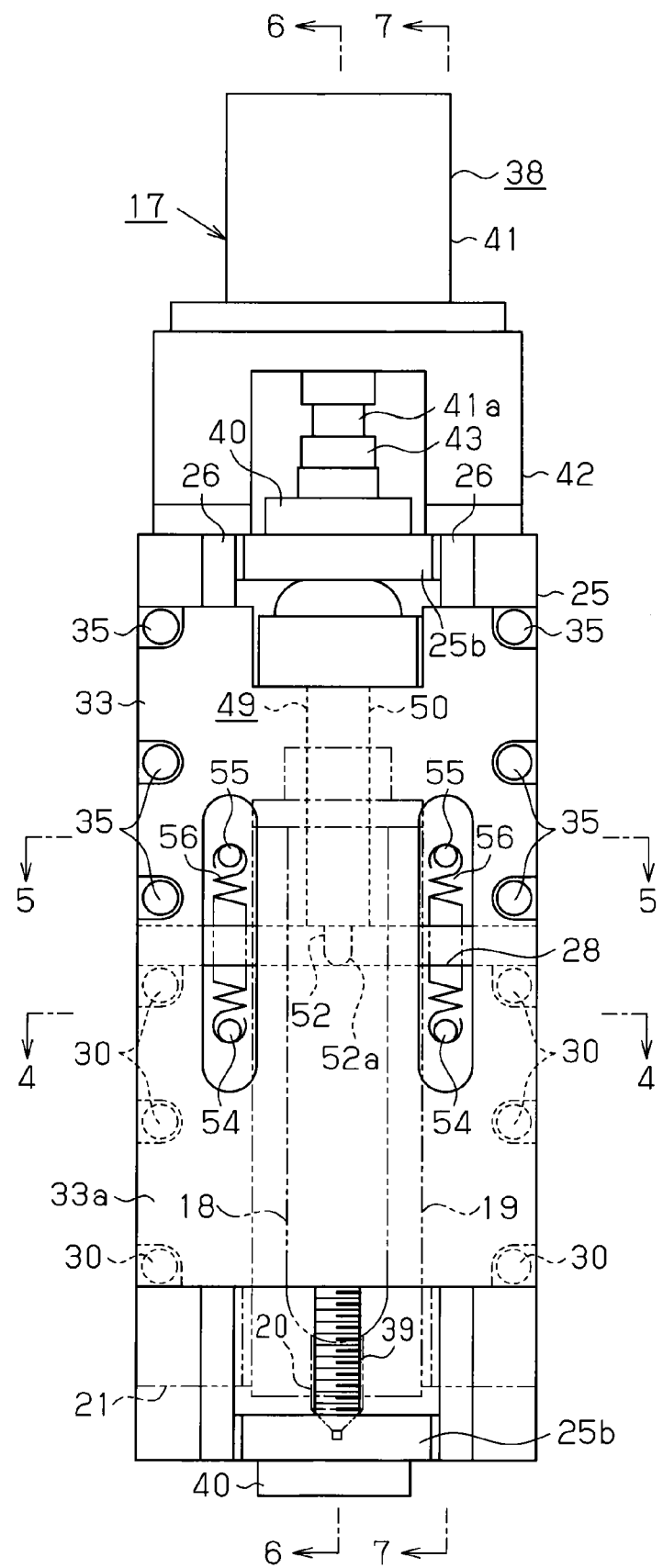
FIG. 2 is an enlarged front view showing the rough and fine movement device of FIG. 1.
Figure 3:
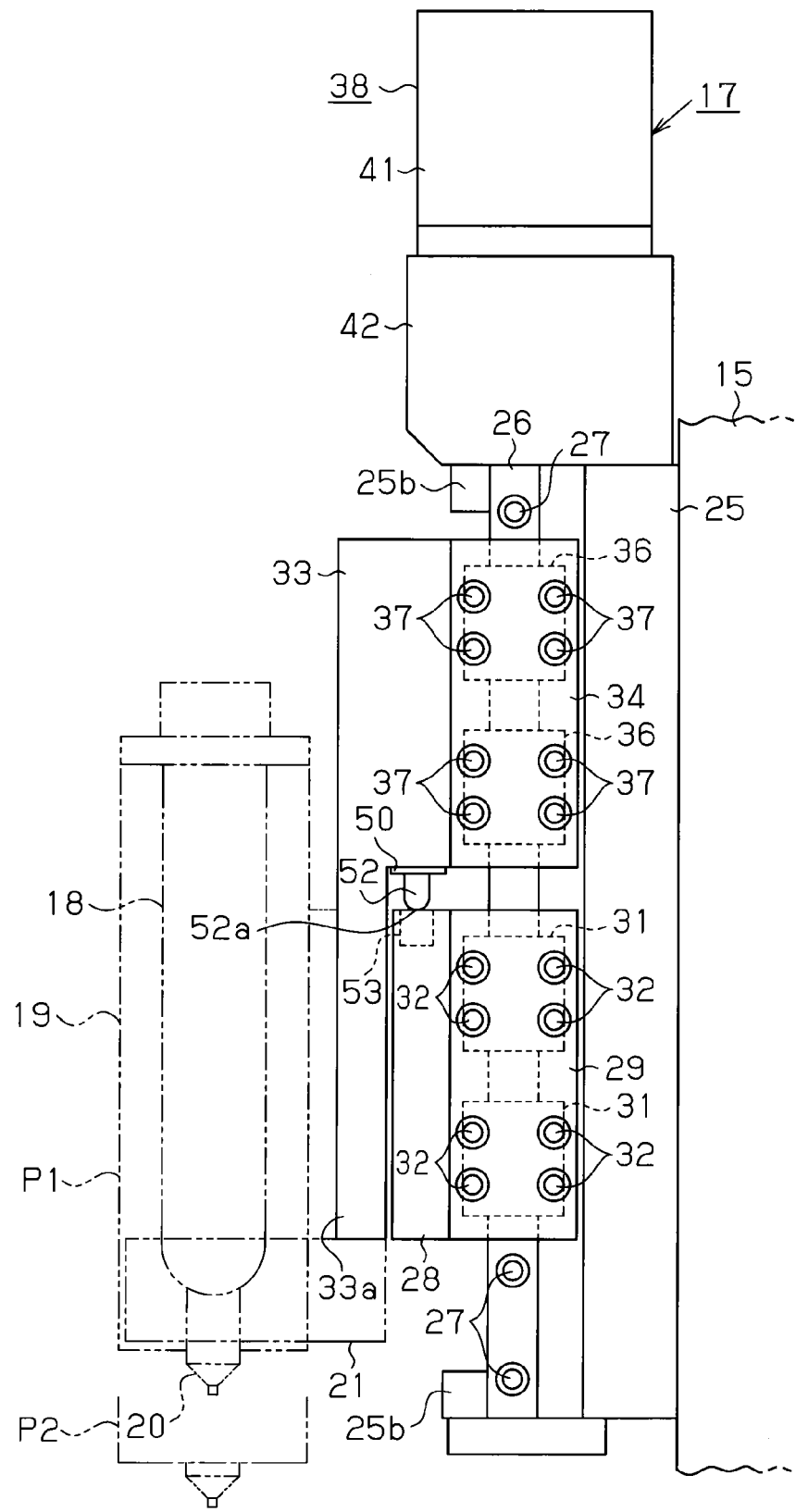
FIG. 3 is a side view showing the rough and fine movement device of FIG. 2.
Figure 4A:
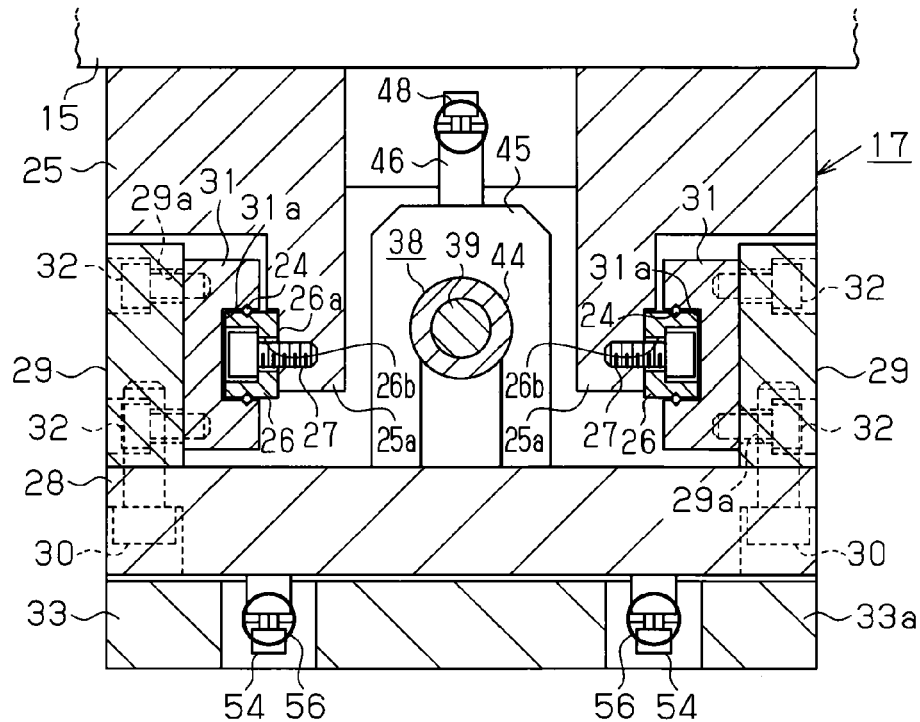
FIG. 4(a) is an enlarged cross-sectional view taken along line 4-4 of FIG. 2.
Figure 4B:
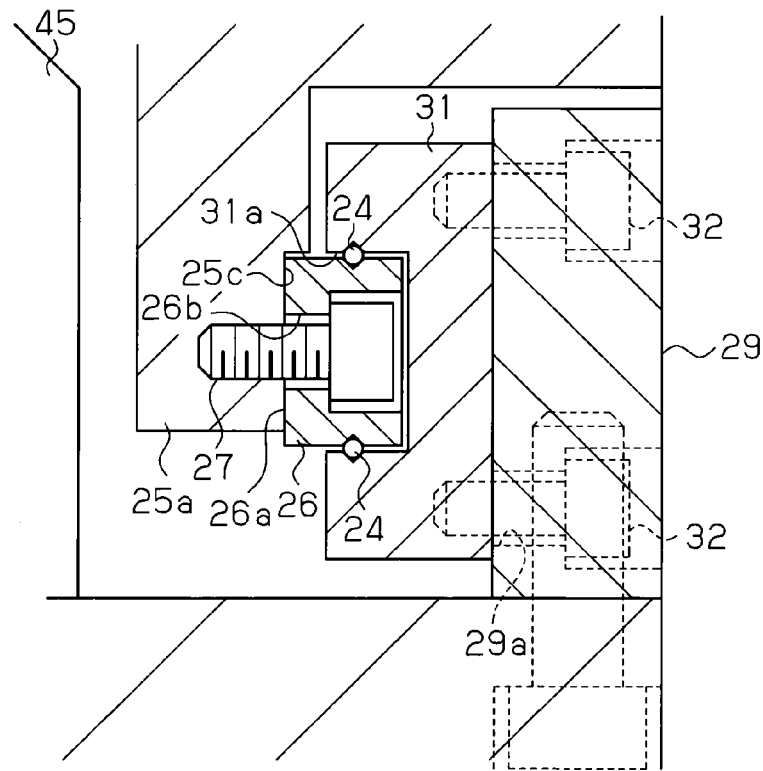
FIG. 4(b) is an enlarged cross-sectional view showing part of FIG. 4(a)
Figure 5A:
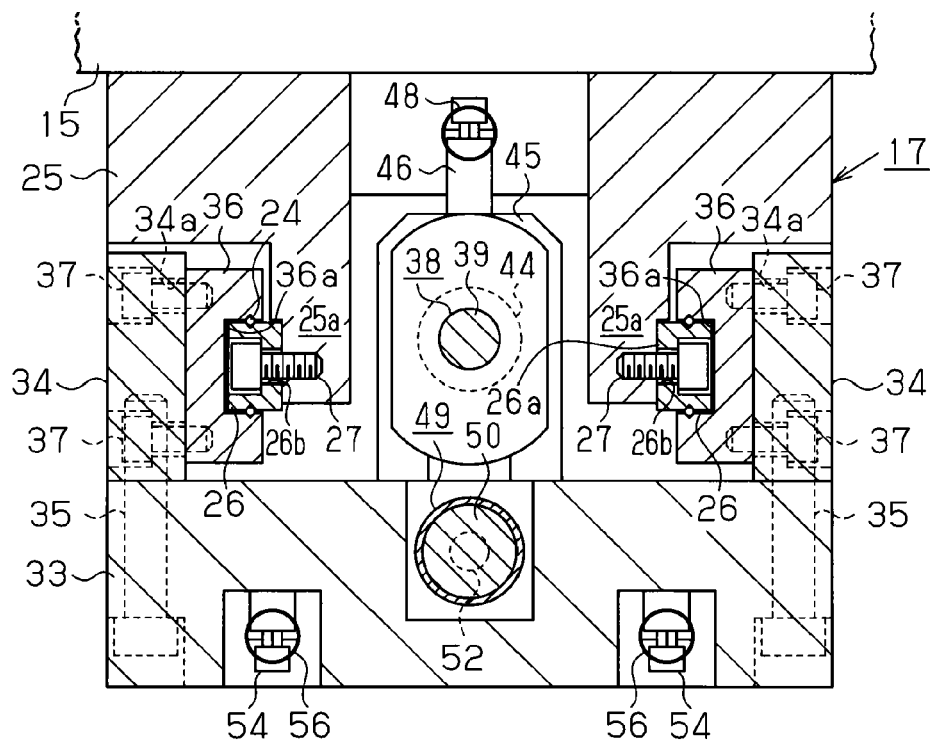
FIG. 5(a) is an enlarged cross-sectional view taken along line 5-5 of FIG. 2.
Figure 5B:
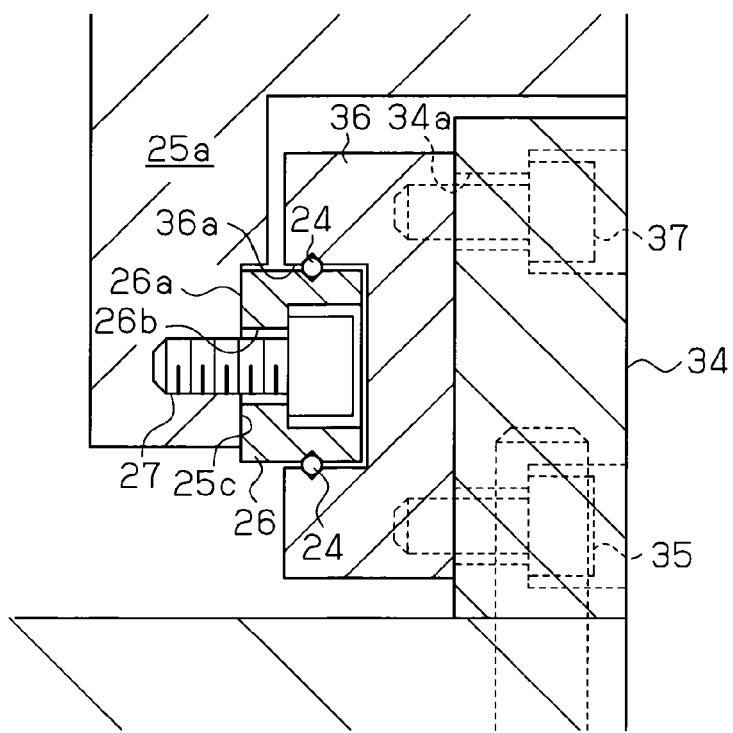
FIG. 5(b) is an enlarged cross-sectional view showing part of FIG. 5(a)

As shown in FIGS. 2 and 3, the rough and fine movement device 17 includes a base plate 25, which is elongated in the vertical direction. As shown in FIGS. 4(a) and 5(a), left and right wall attachments 25a, 25a extend from the front surface of the base plate 25 parallel to each other in the vertical direction (Z-axis direction). Outwardly facing reference surfaces 25c, 25c are formed on the laterally outer side surfaces of the two wall attachments 25a, 25a. Two rails 26, 26 serving as guide members are attached by a plurality of bolts 27 to the reference surfaces 25c, 25c. That is, the rails 26, 26 are positioned by the reference surfaces 25c, 25c. As shown in FIGS. 4(b) and 5(b), each rail 26 has an inner side surface, which serves as a positioning surface 26a that comes in contact with the corresponding reference surface 25c.

As shown in FIG. 2 to FIG. 4, the front surface of the base plate 25 supports a plate-shaped first mobile body 28 so that the first mobile body 28 is movable in the vertical direction along the two rails 26, 26. Specifically, as shown in FIG. 4(a), left and right support plates 29, 29 are attached by a plurality of bolts 30 to left and right parts of the rear surface of the first mobile body 28. At least a pair of first guided bodies 31, 31 (two pairs shown in FIG. 3) are attached at the inner side surfaces of the support plates 29, 29 by a plurality of bolts 32 facing toward each other. The inner side surface of each guided body 31 (surface facing toward the corresponding guided body 31) includes a groove 31a. Each guided body 31 is guided by the corresponding rail 26 in the groove 31a by a plurality of balls 24.

As shown in FIGS. 2, 3, and 5, the second mobile body 33 is supported at the front surface of the base plate 25 above the first mobile body 28 so as to be movable in the vertical direction the two rails 26, 26. Specifically, as shown in FIG. 5(a), left and right support plates 34, 34 are attached by a plurality of bolts 35 to left and right parts of the rear surface of the second mobile body 33. At least a pair of second guided bodies 36, 36 (two pairs shown in FIG. 3) are attached at the inner side surfaces of the support plates 34, 34 by a plurality of bolts 37 facing toward each other. The inner side surface of each guided body 36 (respective opposing surface) includes a groove 36a. Each guided body 36 is guided by the corresponding rail 26 in the groove 36a by the plurality of balls 24 at a position above the guided bodies 31 of the first mobile body 28.

As shown in FIG. 3, the second mobile body 33 has a lower front surface defining a wall extension 33a that covers the front side of the first mobile body 28. The syringe tank 18 and the heater block 19 are attached to the front surface of the wall extension 33a of the second mobile body 33, and the distance sensor 21 is attached to the lower end of the wall extension 33a.

Figure 6:
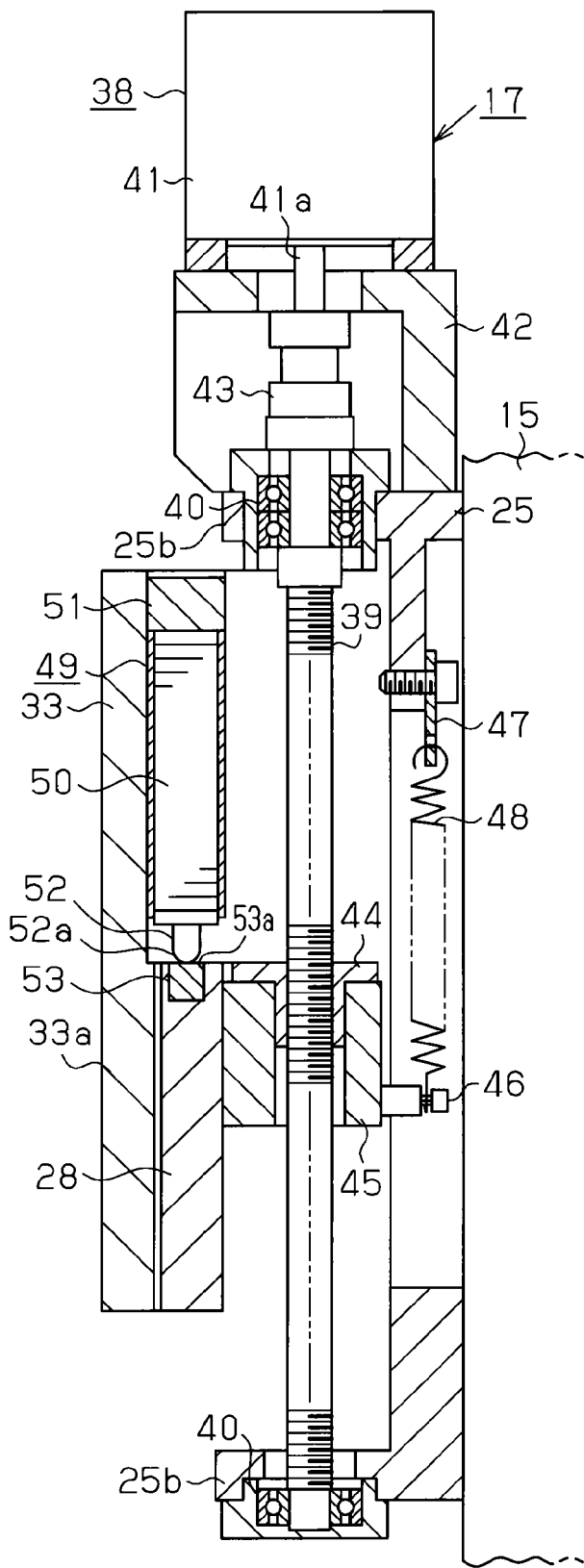
FIG. 6 is a cross-sectional view taken along line 6-6 of FIG. 2.

As shown in FIGS. 2 and 6, a first drive mechanism 38 for roughly moving the first mobile body 28 in the vertical direction is arranged on the front surface of the base plate 25. Specifically, support walls 25b, 25b are formed integrally with the upper and lower front ends of the base plate 25 between the rails 26, 26 at the central part of the base plate 25. As shown in FIG. 6, the two ends of a feed screw 39 are rotatably supported by the support walls 25b, 25b by way of a pair of ball bearings 40. A motor 41 is attached to the upper end of the base plate 25 by way of a bracket 42, and a motor shaft 41a is coupled to the upper end portion of the feed screw 39 by a coupling 43.

A nut 44, which is mated with the feed screw 39, is fixed to the rear surface of the first mobile body 28 by a nut receiver 45. A hooking pin 46 projects from the rear surface of the nut receiver 45, and a hooking plate 47 is attached to the upper rear surface of the base plate 25 in correspondence with the hooking pin 46. A spring 48 (first spring) is hooked between the hooking pin 46 and the hooking plate 47. The spring 48 biases the nut 44 upwards in the axial direction of the feed screw 39.

The motor 41 rotates the feed screw 39 in either one of left or right directions to roughly move the first mobile body 28 with the nut 44 along the rails 26, 26 in either upward or downward directions. In this state, backlash between the feed screw 39 and the nut 44 is eliminated since the nut 44 is biased upward by the spring 48. When the motor 41 is not operating, the first mobile body 28 is prevented from falling freely due to its own weight since the nut 44 is biased upward by the spring 48.

As shown in FIGS. 2, 5, and 6, a second drive mechanism 49 is arranged between the first mobile body 28 and the second mobile body 33. When the first drive mechanism 38 stops operating, the second drive mechanism 49 finely moves the second mobile body 33 relative to the first mobile body 28 to finely adjust the position of the second mobile body 33.

Specifically, as shown in FIG. 6, a support block 51 supports the upper end portion of the fine movement actuator 50 (hereinafter simply referred to as actuator 50) at the rear central part of the second mobile body 33. The actuator 50 is formed by an assembly of piezoelectric elements that expand and contract when voltage is applied. A substantially cylindrical metal contactor 52 is connected to the piezoelectric element at the lower end of the actuator 50. The contactor 52 has a lower end, or distal end, defining a spherical portion 52a (first contact surface). The spherical portion 52a is substantially semispherical. A metal pad 53 is embedded in the upper end of the first mobile body 28. The pad 53 has an upper surface defining a contact surface 53a (second contact surface) that is contactable with the spherical portion 52a of the contactor 52. The second contact surface 53a is planar. The material used for the contactor 52 and the pad 53 is hard and has superior wear-resistance such as chrome molybdenum steel.

Figure 7:
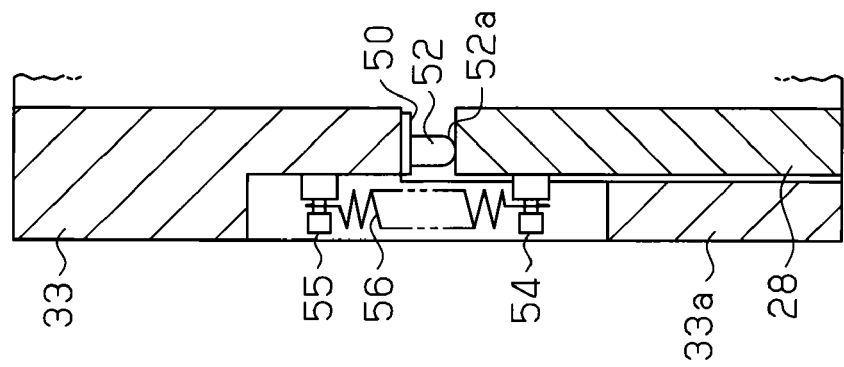
FIG. 7 is a partial cross-sectional view taken along line 7-7 of FIG. 2.

As shown in FIGS. 2 and 7, two pairs of hooking pins 54, 55 project from the left and right parts of the front surfaces of the first mobile body 28 and the second mobile body 33. The hooking pins 54 are arranged on the first mobile body 28, and the hooking pins 55 are arranged on the second mobile body 33. That is, the hooking pins 54, 55 are arranged one above the other. Two springs 56, 56 (second springs) serving as a connection member for connecting the first mobile body 28 and the second mobile body 33 is hooked between the hooking pins 54, 55. Each of the second springs 56, 56 produces a biasing force that is stronger than that of the first spring 48, which biases the nut 44. The first mobile body 28 and the second mobile body 33 are biased toward each other by the second springs 56, 56. Due to this biasing force, the spherical portion 52a (i.e., spherical surface) of the contactor 52 contacts the contact surface 53a (i.e., plane) of the pad 53 in a state of substantial point contact. Therefore, the second springs 56, 56 connect the first mobile body 28 and the second mobile body 33 in a relatively movable manner. When the actuator 50 is expanded or contracted in this state, the contactor 52 moves in the axial direction. As a result, the second mobile body 33 finely moves relative to the first mobile body 28 and finely adjusts the position of the second mobile body 33.

The operation of the liquid supply device incorporating the rough and fine movement device 17 will now be discussed.

During the operation of the liquid supply device, the work piece W, such as substrate, is placed on the table 12. Then, the work piece W is attracted to and held by the vacuum suction device (not shown). In this state, the control device 22 sends an actuation signal to the Y-axis actuator 14 and the X-axis actuator 16 to move the gantry 13 and the X-axis saddle 15 in the Y-axis direction and the X-axis direction, respectively. This moves the supply head 20 on the second mobile body 33 of the rough and fine movement device 17 to the standby position P1 where the supply head 20 faces a predetermined liquid application position on the work piece W.

Then, the control device 22 sends an actuation signal to the motor 41 of the first drive mechanism 38 in the rough and fine movement device 17 to rotate the feed screw 39 and roughly move the first mobile body 28 and the second mobile body 33 downward with the nut 44. The rough movement moves the supply head 20 on the second mobile body 33 with a large stroke from the upper standby position P1 to the lower supply position P2. The supply head 20 stops moving at the supply position P2.

In this state, the distance sensor 21 detects the distance between the tip of the supply head 20 and the work piece W. In accordance with the detection, the control device 22 applies positive or negative voltage to the actuator 50 of the second drive mechanism 49 in the rough and fine movement device 17 to expand or contract the piezoelectric elements of the actuator 50. Due to such expansion or contraction, the second mobile body 33 moves relative to the first mobile body 28 with a relatively fine stroke. As a result, the position of the supply head 20 is finely adjusted such that the distance between the tip of the supply head 20 and the work piece W becomes a predetermined value. In this state, liquid is supplied to the work piece W.

The rough and fine movement device 17 of the first embodiment has the advantages described below.

(1) The spherical portion 52a of the contactor 52 arranged at the lower end of the actuator 50 on the second mobile body 33 is in constantly in point contact with the contact surface 53a of the pad 53, which is arranged on the first mobile body 28. Thus, even if the feed screw 39 of the first drive mechanism 38 were to be rotated in an eccentric manner or even if the machining accuracy or assembly accuracy of the feed screw 39 were to be low, the second mobile body 33 is not adversely affected through the actuator 50.

Therefore, the second mobile body 33 is finely moved with high accuracy to a predetermined position based on the accuracy of the reference surfaces 25c of the wall attachments 25a on the base plate 25 and the positioning surfaces 26a of the rails 26. Thus, the supply head 20 is accurately positioned in the correct direction at the supply position P2 spaced by a predetermined distance from the surface of the work piece W. Therefore, when liquid such as a seal material is supplied from the supply head 20 to the work piece W, a liquid applied portion Wa is accurately formed with the required pattern on the work piece W. This obtains high processing accuracy for the work piece W.

(2) As shown in FIGS. 4(a), 4(b), 5(a), and 5(b), in the rough and fine movement device 17, the positioning surface 26a of each rail 26 is attached to the corresponding reference surface 25c of the base plate 25 by the plurality of bolts 27. In particular, in the first embodiment, a slight gap is formed between a bolt insertion hole 26b formed in each rail 26 and the bolt 27, and the attachment position and attachment angle of each rail 26 relative to the base plate 25 is finely adjusted in advance using such gap. Thus, the attachment accuracy of the rails 26, 26 is easily ensured without using a separate component such as a spacer. This obtains high attachment accuracy of the first and second mobile bodies 28 and 33. Accordingly, the first and the second mobile bodies 28 and 33 may be moved with a low load without generating vibration and without any complication between the rails 26, 26 and the first and second mobile bodies 28 and 33.

(3) In the rough and fine movement device 17, the rails 26, 26 for guiding the first and second mobile bodies 28 and 33 are fixed to the reference surfaces 25c, 25c of the base plate 25. The reference surfaces 25c, 25c are formed facing outward in the lateral direction. Thus, when finishing the reference surfaces 25c, 25c on a movement table of a milling machine or a grinding machine, the reference surfaces 25c, 25c may be machined with the side surface of a cutter of the milling machine or grinding machine. Therefore, pitching that occurs when feeding the movement table may be ignored, and the reference surfaces 25c, 25c can be finished with high accuracy. Thus, high accuracy is obtained when attaching the rails 26, 26.

(4) As shown in FIGS. 4(a), 4(b), 5(a), and 5(b), in the rough and fine movement device 17, the two support plates 29, 29 are attached to the left and right portions of the rear surface of the first mobile body 28, and the two support plates 34, 34 are attached to the left and right portions of the rear surface of the second mobile body 33. The two guided bodies 31, 31 are attached facing each other to the inner side surfaces of the support plates 29, 29 by the plurality of bolts 32. In the same manner, the two guided bodies 36, 36 are attached facing each other to the inner side surfaces of the support plates 34, 34 by the plurality of bolts 37. The guided bodies 31 and 36 are each guided by the corresponding rail 26 with the balls 24 in the corresponding grooves 31a and 36a. In particular, in the first embodiment, a slight gap is formed between bolt insertion holes 29a and 34a, which are formed in the support plates 29 and 34 and the bolts 32 and 37, respectively. The attachment angles and positions of the support plates 29 and 34 relative to the guided bodies 31 and 36 are finely adjusted in advance using such gaps. This maintains a satisfactory positional relationship between the positioning surface 26a of each rail 26 and the corresponding guided bodies 31 and 36. Therefore, in the same manner as the attachment of the rails 26, 26, the adjustment of the position and inclination angle of each of the support plates 29 and 34 are easily performed without using a spacer or the like.

(5) In the rough and fine movement device 17, the spring 48 biases the nut 44 of the first drive mechanism 38 upwards in the axial direction of the feed screw 39. This eliminates backlash in the mating relationship between the feed screw 39 and the nut 44.

When the motor 41 is not operating, the first mobile body 28 is held in place, and the first mobile body 28 does not fall freely due to its own weight. This prevents the supply head 20 of the syringe tank 18 from hitting the work piece W.

(6) In the rough and fine movement device 17, the support plates 29 and 34 are fixed to the left and right portions in the rear surface of the first and the second mobile bodies 28 and 33, respectively. Further, the guided bodies 31 and 36, which are engaged with the rails 26, are fixed to the inner sides of the support plates 29 and 34, respectively. That is, the first and the second mobile bodies 28 and 33, in entirety, formed the shape of a gate. This increases the rigidity and strength of the first and second mobile bodies 28 and 33. This not only contributes to improving the processing accuracy for the work piece W but also enables reduction of the left and right widths of the first and second mobile bodies 28 and 33 (e.g., as compared with the structure shown in FIG. 10). Thus, the entire device 17 can be reduced in size.

(7) The rough and fine movement device 17 includes the distance sensor 21, which detects the distance between the tip of the supply head 20 and the work piece W. The control device 22 controls the fine movement of the second mobile body 33 in accordance with the detection of the distance sensor 21. Accordingly, the second mobile body 33, which includes the supply head 20, is moved based on the distance detected by the distance sensor 21. Thus, even if the surface of the work piece W is deformed, the distance between the surface of the work piece W and the tip of the supply head 20 is always kept constant. This forms the liquid applied portion with further accuracy.

Second Embodiment

A second embodiment of the present invention will now be discussed mainly on parts differing from the first embodiment.

Figure 8:
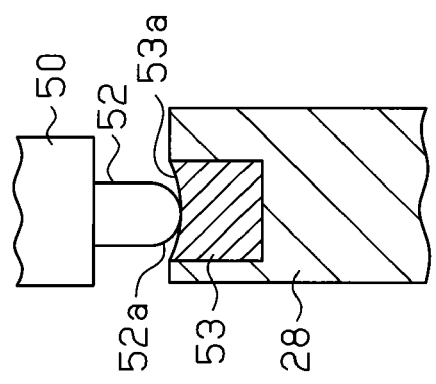
FIG. 8 is a partial cross-sectional view of a rough and fine movement device of a second embodiment.

As shown in FIG. 8, in the second embodiment, a concave contact surface 53a is defined in the upper surface of the pad 53, which is embedded in the upper end of the first mobile body 28. The spherical portion 52a of the contactor 52 located at the lower end of the fine movement actuator 50 is in contact with the contact surface 53a of the pad 53.

Accordingly, the second embodiment has substantially the same advantages as the first embodiment.

In particular, in the second embodiment, the area of contact between the spherical portion 52a of the contactor 52 and the contact surface 53a of the pad 53 may be increased while maintaining a state of substantial point contact. This improves the durability of the spherical portion 52a and the contact surface 53a.

Third Embodiment

A third embodiment of the present invention will now be discussed mainly on parts differing from the first embodiment.

Figure 9:
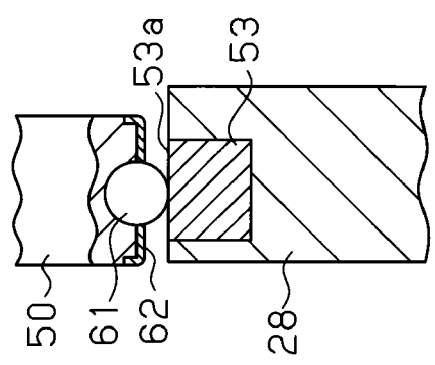
FIG. 9 is a partial cross-sectional view of a rough and fine movement device of a third embodiment.

As shown in FIG. 9, in the third embodiment, a contactor 61, which is formed by a spherical body made of a hard metal material, is attached to the lower end of the fine movement actuator 50 by a fastener 62 so as to be inseparable from the fine movement actuator 50 and rotatable in any direction. The contactor 61 has an outer lower end (i.e., spherical surface) that is in contact with the contact surface 53a of the pad 53 on the first mobile body 28 in a state of substantial point contact.

Accordingly, the third embodiment has substantially the same advantages as the first embodiment.

In particular, in the third embodiment, wear of the contactor 61 is reduced since the contactor 61 rotates. In addition, the relative movement of the contactor 61 and the contact surface 53a of the pad 53 becomes smooth due to the rotation of the contactor 61. This absorbs slight accuracy errors between the contactor 61 and the contact surface 53a in a desirable manner.

Fourth Embodiment

A fourth embodiment of the present invention will now be discussed mainly on parts differing from the first embodiment.

Figure 10A:
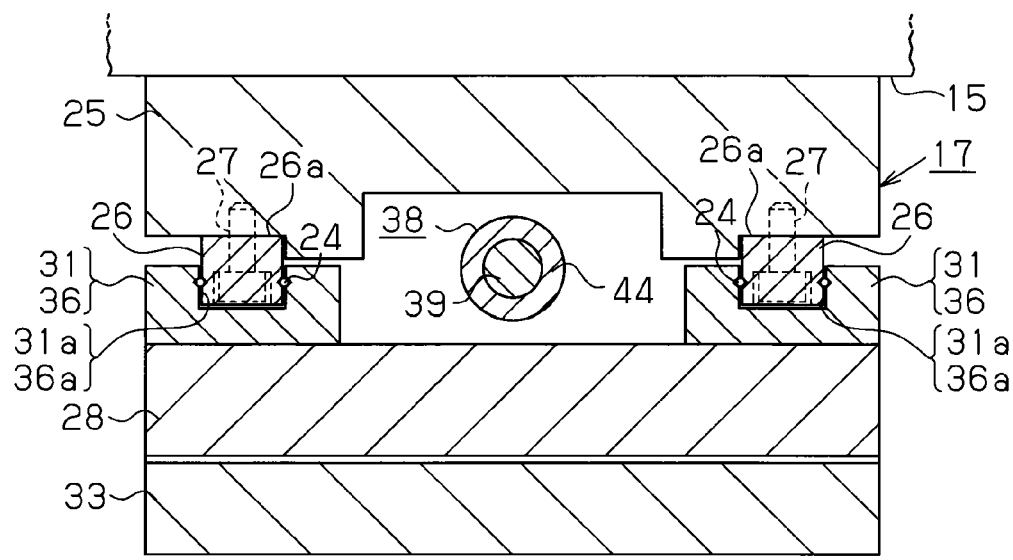
FIG. 10(a) is a cross-sectional view of a rough and fine movement device of a fourth embodiment.
Figure 10B:
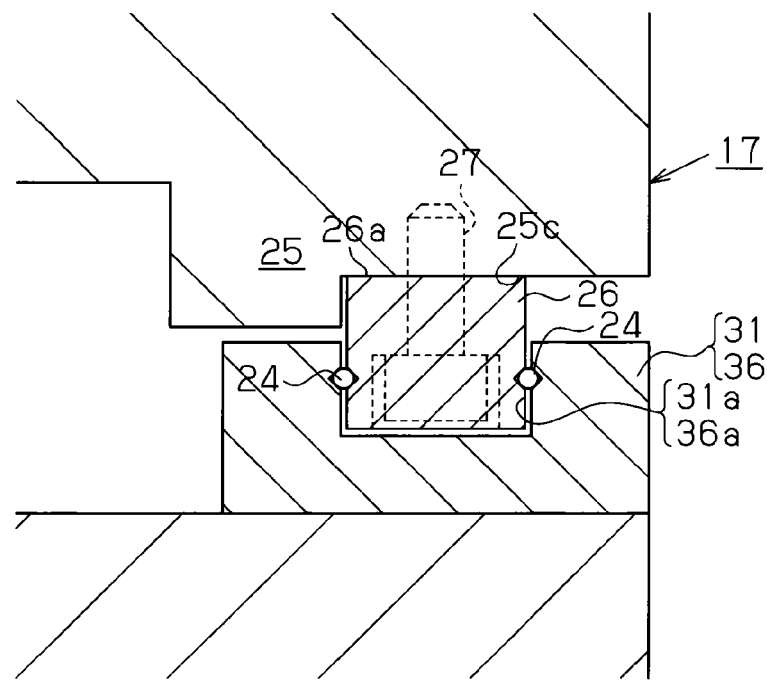
FIG. 10(b) is an enlarged cross-sectional view showing part of FIG. 10(a).

As shown in FIGS. 10(a) and 10(b), in the fourth embodiment, the base plate 25 has a front surface defining two reference surfaces 25c, 25c. The two rails 26, 26 are attached to the reference surfaces 25c, 25c by the plurality of bolts 27. A plurality of guided bodies 31 and 36 are directly attached to the rear surfaces of the first mobile body 28 and the second mobile body 33 in a state facing rearward. The guided bodies 31 and 36 are guided relative to the positioning surfaces 26a of the rails 26.

In the fourth embodiment, since the guided bodies 31, 36 are directly attached to the rear surfaces of the first mobile body 28 and the second mobile body 33 without any support plate or the like, in comparison with the first embodiment, less components are used. Thus, the structure is simple, and the number of components is reduced.

[Modifications]

The above-described embodiments may be modified and embodied in the forms described below.

In the rough and fine movement device of the above-described embodiments, the actuator 50 is attached to the second mobile body 33, and the contactor 52 at the distal end of the actuator 50 contacts the pad 53 of the first mobile body 28. However, the actuator 50 may be arranged on the first mobile body 28, and the pad 53, which contacts the contactor 52 at the distal end of the actuator 50, may be arranged on the second mobile body 33.

In the rough and fine movement device of the above-described embodiments, the contactor 52 at the distal end of the actuator 50 is spherical, and the pad 53 is planar. However, the contactor 52 at the distal end of the actuator 50 may be planar, and the pad 53 may be spherical.

In the rough and fine movement device of the above-described embodiments, the connection member for connecting the first and the second mobile bodies 28 and 33 is not limited to the two springs 56, 56 and may be a single spring 56.

In the liquid supply device of the above-described embodiments, the table 12 for supporting the work piece W is fixed to the base 11, and the gantry 13 is arranged on the base 11 so as to be movable in the Y-axis direction. However, the gantry 13 may be fixed to the base 11, and the table 12 may be arranged on the base 11 so as to be movable in the Y-axis direction.

In the above-described embodiments, the rough and fine movement device 17 incorporates the liquid supply device, and the supply head 20 is moved to the required position. Instead, the rough and fine movement device 17 may be arranged in a device different from the liquid supply device. For instance, the rough and fine movement device 17 may be arranged in a laser cutting machine. In this case, a laser beam emission head of the laser beam machine is arranged on the second mobile body 33 of the rough and fine movement device 17, and the movement of the laser beam emission head is controlled by the rough and fine movement device 17.

The invention claimed is:

1. A rough and fine movement device comprising:
a guide member including two parallel rails;
a first mobile body and a second mobile body movable along the guide member;
a connection member which connects the first mobile body and the second mobile body in a relatively movable manner;
a first drive mechanism which roughly moves the first mobile body by a first stroke;
a second drive mechanism which is arranged between the first mobile body and the second mobile body and which finely moves the second mobile body relative to the first mobile body by a second stroke, wherein the second drive mechanism includes an actuator arranged on one of the first mobile body and the second mobile body, with the actuator including a contactor having a first contact surface, the other one of the first mobile body and the second mobile body has a second contact surface which is contactable with the first contact surface of the contactor, and at least one of the first contact surface and the second contact surface is spherical;
at least two first guided bodies arranged facing toward each other on the first mobile body and guided by the two rails; and
at least two second guided bodies arranged facing toward each other on the second mobile body and guided by the two rails.

2. The rough and fine movement device according to claim 1, further comprising:
a base to which the two rails are fixed, with the base including two outwardly facing reference surfaces to which the two rails are positioned.

3. The rough and fine movement device according to claim 2, further comprising:
a motor which drives the first drive mechanism;
wherein the first drive mechanism includes:
a feed screw rotated by the motor; and
a nut fixed to the first mobile body and mated with the feed screw, in which the feed screw is arranged between the two rails.

4. The rough and fine movement device according to claim 3, further comprising:

a first spring which is connected so as to act on the nut and which biases the nut to in one direction along an axial direction of the feed screw.

5. The rough and fine movement device according to claim 4, wherein the connection member includes a second spring, and the second spring has a biasing force that is stronger than that of the first spring, which biases the nut.

6. The rough and fine movement device according to claim 1, further comprising:
 a motor which drives the first drive mechanism;
 wherein the first drive mechanism includes:
 a feed screw rotated by the motor; and
 a nut fixed to the first mobile body and mated with the feed screw, in which the feed screw is arranged between the two rails.

7. The rough and fine movement device according to claim 6, further comprising:
 a first spring which is connected so as to act on the nut and which biases the nut to in one direction along an axial direction of the feed screw.

8. The rough and fine movement device according to claim 7, wherein the connection member includes a second spring, and the second spring has a biasing force that is stronger than that of the first spring, which biases the nut.

* * * * *